Dec. 1, 1931.  C. McVEETY  1,834,167

AUTOMOBILE VENTILATOR

Filed Sept. 12, 1929  2 Sheets-Sheet 1

INVENTOR
Charles McVeety
BY
Joshua R. H. Potts
ATTORNEY

Dec. 1, 1931.                     C. McVEETY                    1,834,167
                              AUTOMOBILE VENTILATOR
                         Filed Sept. 12, 1929      2 Sheets-Sheet 2
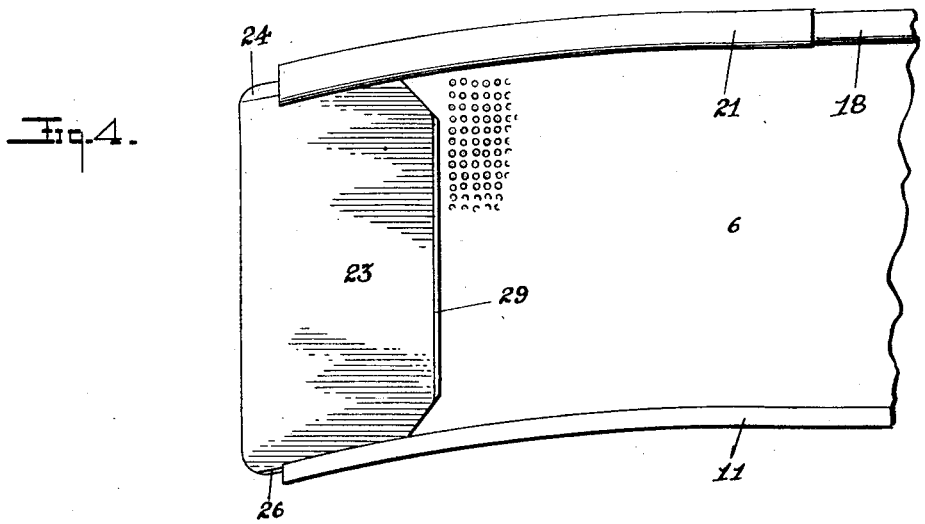
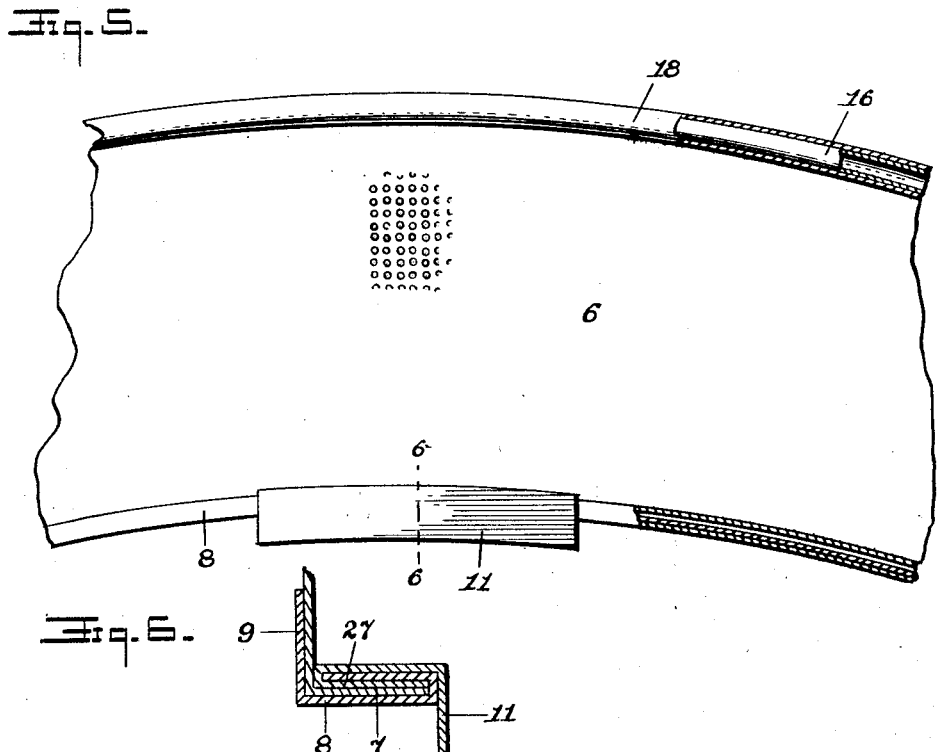
INVENTOR
Charles McVeety
BY
Joshua R. H. Potts
ATTORNEY
WITNESS:

Patented Dec. 1, 1931

1,834,167

UNITED STATES PATENT OFFICE

CHARLES McVEETY, OF CHELTENHAM, PENNSYLVANIA

AUTOMOBILE VENTILATOR

Application filed September 12, 1929. Serial No. 391,991.

This invention relates to ventilators and has particular reference to ventilators for automobiles which are provided with what is known as the type "V—V" windshields.

The object of the invention is to provide an improved windshield ventilator.

Another object of the invention is to provide a windshield ventilator which is arranged for adjustment for different widths of windshields where the arc of the cowl is the same.

Still another object is to provide a windshield ventilator which will not interfere in any manner with the operation of the windshield in its up and down movements and also will not interfere with the windshield wiper, nor impair the vision of the car operator.

According to the invention the ventilator comprises primarily a sheet of perforated metal whose lower end is rolled into a supporting member and in which is included a retaining member for assisting in holding the ventilator in position, the upper end of the perforated material extending through a slot in a hollow tube and bent over to prevent its removal, said hollow tube being surrounded by a rubber tube for bearing against the windshield and the outer ends of said sheet material having plates adjustably secured in a tube which is slidably mounted around the rubber tube.

Figure 1:
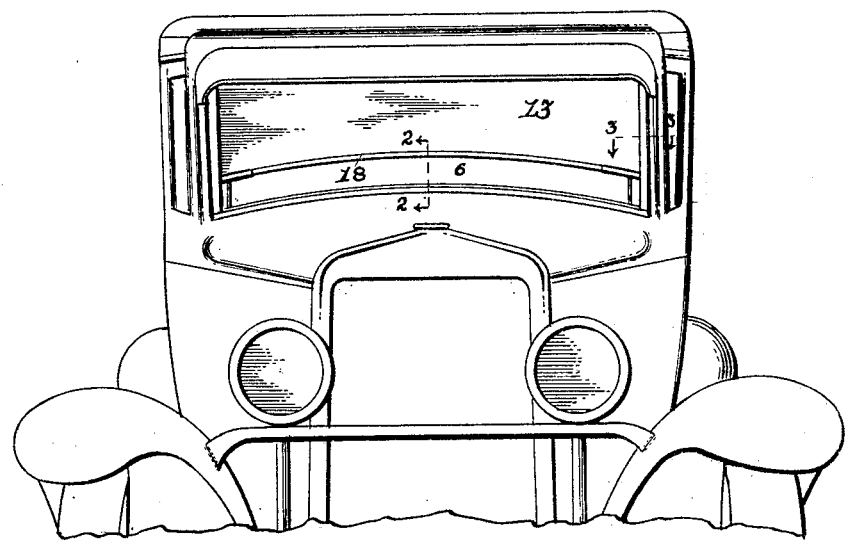
Figure 2:
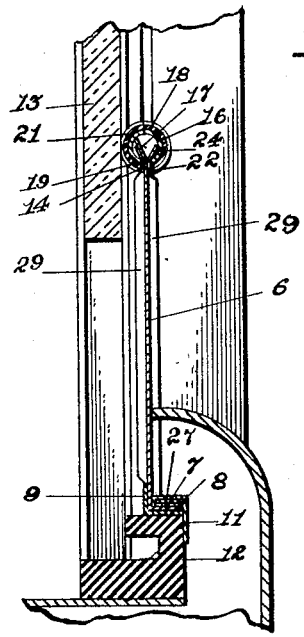
Figure 3:
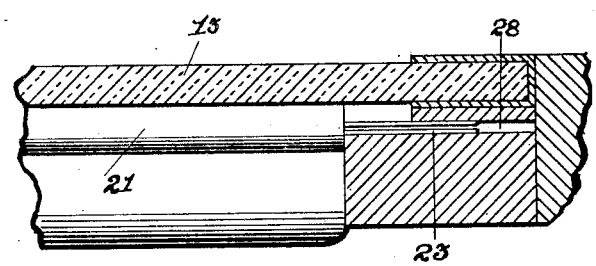

The drawings illustrate an embodiment of the invention and the views therein are as follows:

Figure 1 is a partial front elevation of an automobile with my improved ventilator thereon, Figure 2 is a vertical sectional view taken on the line 2—2 of Figure 1, Figure 3 is a longitudinal section taken on the line 3—3 of Figure 1, Figure 4 is a front elevation of the ventilator with the major portion broken away, Figure 5 is a like view of the center portion of the ventilator showing a part thereof in section and with both ends broken away, and Figure 6 is an enlarged detail view showing the connection of the perforated material to the lower bent metal strip with the securing wing included therein, and is taken on the line 6—6 of Figure 5.

The ventilator has a long arcuate sheet of thin perforated metal 6, the arc of the same depending entirely upon the arc of the cowl of the automobile with which the said ventilator is intended to be used. The lower part of this perforated sheet is bent inwardly at right angles, as at 7, and is surrounded throughout its length by the bent metal strip 8 which has an upwardly extending portion 9 at the front thereof.

At the approximate center of the bent metal strip there is included in the rolled joint a wing 11 which is bent at its upper end in a forward right angle direction and is curled around beneath the upper part of the bent metal strip 8 and the inwardly extending end 7 of the perforated material so that the same will be securely held and when the ventilator is placed in position, as shown in Figure 2, will rest against the rubber buffer 12 which extends the full length of the windshield 13.

The upper end of the perforated metal plate 6 passes through a slot 14 in the metal tube 16 and is bent over within said tube, as shown at 17, to prevent its accidental dislodgment therefrom.

The metal tube 16 is surrounded by a rubber tube 18 which is slit at 19 to permit its being passed over said metal tube and when the same is in position it may be cemented so as to prevent its removal therefrom.

At each end of the rubber tube 18 there is provided a metallic tube 21 which has a slot 22 for permitting the same to pass over and surround the end portion of said rubber tube, the slot providing the opening for admitting the perforated sheet 6.

On each side of the perforated plate 6 and at the ends thereof, I provide wings in the form of metallic extension plates 23 which extend through the slots 22 in the tube 21, and have their upper ends bent over, as at 24, to prevent their lateral disconnection from said tube while the lower ends thereof have right angular bends 26 which occupy, at the end of the ventilator, the same position as the inner curled portion 27 of the wing 11 occupies at the center of the ventilator and at this point there is sufficient clearance allowed for the movement of the wings 23 and the flange 26 so that the wings can be extended outwardly to fit a windshield which is wider than the length of the perforated plate 6.

When these wings 23 are extended the tube 21 is also extended so that the tube will always be pulled outwardly to a position such as shown in Figure 3, while the outer ends of the wings 23 will extend into the recess 28 which is found in all automobile posts.

The inner ends of the wings 23 are provided with out-turned edges 29 which provide means whereby the said wings may be adjusted.

It will, of course, be understood that the arc of the ventilator will be different for different makes of cars but there are many cars on the market today where the arc of the cowl is the same, except that the length is merely a few inches longer. For this reason the adjustable wings 23 will provide the additional length so that the ventilator with a single arc will be adaptable for a number of different cars.

Of course, the ventilator illustrated may be changed in various ways without departing from the invention herein set forth and hereafter claimed.

The invention is hereby claimed as follows:—

1. A ventilator comprising a sheet, a slitted rigid tube embracing an edge of and fixed to the sheet, a slitted cushioning tube embracing the rigid tube, a wing extending beyond the end of the sheet and slidable in said tubes, and a slitted sleeve embracing the ends of said cushioning tube and sheet and a part of the wing, and slidable independently of each.

2. A ventilator comprising a sheet, a slitted rigid tube embracing an edge of and fixed to the sheet by an edge of the sheet bent within said tube at an angle to the plane of the sheet, a slitted cushioning tube embracing the rigid tube, a wing extending beyond the end of the sheet and slidable in said tubes, and a slitted sleeve embracing the ends of said cushioning tube and sheet and a part of the wing, and slidable independently of each.

3. A ventilator comprising a sheet, a slitted rigid tube embracing an edge of and fixed to the sheet by an edge of the sheet bent within said tube at an angle to the plane of the sheet, a slitted cushioning tube embracing the rigid tube, a wing extending beyond the end of and having an edge bent opposite to the edge of the sheet and slidable in said tubes, and a slitted sleeve embracing the ends of said cushioning tube and sheet and a part of the wing, and slidable independently of each.

4. A ventilator comprising a sheet, a slitted rigid tube embracing an edge of and fixed to the sheet, a slitted cushioning tube embracing the rigid tube, a wing extending beyond the end of the sheet and slidable in said tubes in contact with one side of said sheet, and a slitted sleeve embracing the ends of said cushioning tube and sheet and a part of the wing, and slidable independently of each.

5. A ventilator comprising a sheet, a slitted rigid tube embracing an edge of and fixed to the sheet, a slitted cushioning tube embracing the rigid tube, a wing extending beyond the end of the sheet and slidable in said tubes in superposed engagement with said sheet, and a slitted sleeve embracing the ends of said cushioning tube and sheet and a part of the wing, and slidable independently of each.

6. A ventilator comprising a sheet, a slitted rigid tube embracing an edge of and fixed to the sheet, a slitted cushioning tube embracing the rigid tube, a wing extending beyond the end of the sheet and slidable in said tubes, and a slitted sleeve embracing the ends of said cushioning tube and sheet and a part of the wing and slidable longitudinally independently of each toward and from the remote edge of said wing.

7. A ventilator comprising a sheet, a slitted rigid tube embracing an edge of and fixed to the sheet, a slitted cushioning tube embracing the rigid tube, a wing extending beyond the end of the sheet and slidable in said tubes, and a slitted sleeve embracing the ends of said cushioning tube and sheet and a part of the wing which overlaps the sheet, and slidable independently of each.

8. A ventilator comprising a sheet, a slitted rigid tube embracing an edge of and fixed to the sheet, a slitted cushioning tube embracing the rigid tube, a wing extending beyond the end of the sheet and slidable in said tubes in contact with one side of said sheet, and a slitted sleeve embracing the ends of said cushioning tube and sheet and a part of the wing which overlaps the sheet, and slidable independently of each.

9. A ventilator comprising a sheet, a slitted rigid tube embracing an edge of and fixed to the sheet, a slitted cushioning tube embracing the rigid tube, a wing extending beyond the end of the sheet and slidable in said tubes in superposed engagement with said sheet, and a slitted sleeve embracing the ends of said cushioning tube and sheet and a part of the wing which overlaps the sheet, and slidable independently of each.

10. A ventilator comprising a sheet, a slitted rigid tube embracing an edge of and fixed to the sheet, a slitted cushioning tube embracing the rigid tube, a wing extending beyond the end of the sheet and slidable in said tubes in contact with one side of said sheet, and a slitted sleeve embracing the ends of said cushioning tube and sheet and a part of the wing which overlaps the sheet, and slidable longitudinally independently of each.

11. A ventilator comprising a sheet, a slitted rigid tube embracing an edge of and fixed to the sheet by an edge of the sheet bent within said tube at an angle to the plane of the sheet, a slitted cushioning tube embracing the rigid tube, a wing extending beyond the end of and having an edge bent opposite to the edge of the sheet and slidable in said tubes in contact with one side of said sheet, and a slitted sleeve embracing the ends of said cushioning tube and sheet and a part of the wing which overlaps the sheet, and slidable longitudinally independently of each toward and from the remote edge of said wing.

12. A ventilator comprising a sheet, a slitted rigid tube embracing an edge of and fixed to the sheet by an edge of the sheet bent within said tube at an angle to the plane of the sheet, a slitted cushioning tube embracing the rigid tube, a wing extending beyond the end of and having an edge bent opposite to the edge of the sheet and slidable in said tubes in superposed engagement with said sheet, and a slitted sleeve embracing the ends of said cushioning tube and sheet and a part of the wing which overlaps the sheet, and slidable longitudinally independently of each toward and from the remote edge of said wing.

In testimony whereof I have signed my name to this specification.

CHARLES McVEETY.